(12) United States Patent
    Goetz

(10) Patent No.: US 12,654,680 B2
(45) Date of Patent: Jun. 16, 2026

(54) DRIVING SAFETY SYSTEM

(71) Applicant: FORBENCAP GmbH, Sonthofen (DE)

(72) Inventor: Stefan Goetz, Kaiserslautern (DE)

(73) Assignee: FORBENCAP GmbH, Sonthofen (DE)

( * ) Notice: Subject to any disclaimer, the term of this patent is extended or adjusted under 35 U.S.C. 154(b) by 71 days.

(21) Appl. No.: 18/579,651

(22) PCT Filed: Jul. 11, 2022

(86) PCT No.: PCT/EP2022/069347
    § 371 (c)(1),
    (2) Date: Jan. 16, 2024

(87) PCT Pub. No.: WO2023/285397
    PCT Pub. Date: Jan. 19, 2023

(65) Prior Publication Data
    US 2024/0343246 A1      Oct. 17, 2024

(30) Foreign Application Priority Data

Jul. 15, 2021    (DE) ..................... 10 2021 118 383.9

(51) Int. Cl.
    *B60W 30/02*      (2012.01)
    *B60W 10/04*      (2006.01)
    (Continued)

(52) U.S. Cl.
    CPC ............ *B60W 30/02* (2013.01); *B60W 10/04* (2013.01); *B60W 10/18* (2013.01); *B60W 10/20* (2013.01);
    (Continued)

(58) Field of Classification Search
    CPC ...... B60W 30/02; B60W 30/09; B60W 30/04; B60W 30/05; B60W 10/04; B60W 10/18; B60W 10/20; B60W 2555/20
    See application file for complete search history.

(56) References Cited

U.S. PATENT DOCUMENTS

2006/0100766 A1     5/2006  Schwarz et al.
2011/0106361 A1*    5/2011  Staempfle .......... B62D 15/0265
                                                             701/23
(Continued)

FOREIGN PATENT DOCUMENTS

DE      10 2007 013 303       9/2008
DE      10 2010 028 384       11/2010
(Continued)

OTHER PUBLICATIONS

Machine Translation of DE 10 2010 028 384, Google Patents, retrieved Jan. 16, 2024.
(Continued)

*Primary Examiner* — George C Jin
(74) *Attorney, Agent, or Firm* — Warren D. Schickli; Stites & Harbison PLLC

(57)              ABSTRACT

A controller of a motor vehicle comprises a drive motor, wheels, braking devices for the wheels, said braking devices being separately controllable by the controller, an ambient sensor, a driving status sensor and a steering system. For increasing the driving stability, a steering angle is determinable by the controller from signals of the ambient sensor and of the driving status sensor, said steering angle providing a stable driving status in addition to a targeted braking of the wheels, and the steering angle is adjustable at the steering system in order to keep the motor vehicle on the paved road, in particular when driving along a curve, so that the motor vehicle remains on an intersecting plane of the possible dynamic vehicle area ahead with an actual road without skidding or colliding with other obstacles.

15 Claims, 4 Drawing Sheets

(51) Int. Cl.

| | | |
|---|---|---|
| *B60W 10/18* | (2012.01) | |
| *B60W 10/20* | (2006.01) | |
| *B60W 30/09* | (2012.01) | |

(52) U.S. Cl.

CPC ......... *B60W 30/09* (2013.01); *B60W 2555/20* (2020.02); *B60W 2710/18* (2013.01); *B60W 2710/207* (2013.01); *B60W 2720/00* (2013.01)

(56) References Cited

U.S. PATENT DOCUMENTS

| | | | | |
|---|---|---|---|---|
| 2012/0101701 A1* | 4/2012 | Moshchuk | ............ | B60W 30/09 |
| | | | | 701/70 |
| 2013/0030651 A1* | 1/2013 | Moshchuk | ............ | B60W 30/09 |
| | | | | 701/41 |
| 2015/0203109 A1 | 7/2015 | McClain et al. | | |
| 2020/0070818 A1* | 3/2020 | Tominaga | ............ | B60W 10/20 |
| 2020/0290588 A1 | 9/2020 | Källstrand et al. | | |
| 2020/0361490 A1* | 11/2020 | Ribero | ................ | B60W 30/16 |

FOREIGN PATENT DOCUMENTS

| | | | | |
|---|---|---|---|---|
| DE | 10 2018 109 885 | 12/2018 | | |
| EP | 3095659 | 11/2016 | | |
| EP | 3095659 A1 * | 11/2016 | .......... | B60W 50/087 |
| EP | 3756962 A1 * | 12/2020 | ........... | B60W 30/09 |
| WO | 2020136619 | 7/2020 | | |
| WO | 2020182480 | 9/2020 | | |

OTHER PUBLICATIONS

Machine Translation of WO 2020182480, Google Patents, retrieved Jan. 16, 2024.

Machine Translation of DE 10 2018 109 885, Google Patents, retrieved Jan. 16, 2024.

Machine Translation of DE 10 2007 013 303, Google Patents, retrieved Jan. 16, 2024.

International Search Report, European Patent Office, mailed Oct. 11, 2022.

* cited by examiner

DRIVING SAFETY SYSTEM

RELATED APPLICATIONS

This National Stage application claims priority to International Patent Application No. PCT/EP2022/069347, filed Jul. 11, 2022, which claims priority to German Patent Application No. 10 2021 118 383.9, filed Jul. 15, 2021, the entirety of the contents of both are incorporated by reference herein.

TECHNICAL FIELD

The invention relates to a driving safety system in a motor vehicle and to a corresponding method for controlling the motor vehicle and a correspondingly equipped motor vehicle.

BACKGROUND

Motor vehicles with a drive motor and usually four wheels are generally equipped with an ESP (electronic stability program). A controller detects and processes sensor signals, for example from one or several driving status sensors, such as speed, acceleration, static or sliding friction between the individual wheels and a road, a steering angle and the like, and outputs corresponding control signals, for example to brake a rear wheel on the inside of a curve when the motor vehicle drives along a curve. This prevents the motor vehicle from skidding. For this purpose, the motor vehicle has specific and separately controllable braking devices, such as a disk brake for each wheel.

The controller in the motor vehicle receives various signals, such as speed, number of revolutions of the individual wheels, information about a static or sliding friction state of the wheels in relation to a surface, acceleration and speed values, preferably in all spatial directions, and the like. This information can be used by a correspondingly configured control system, among other things, to issue specific control commands, for example to brake individual wheels. In this way, a stable driving condition is maintained up to the limit of what is physically possible.

Furthermore, driving assistance systems are known which, for example, function as a lane departure warning system and/or as a brake assistant in order to keep the motor vehicle safely in a lane even when it drives along a curve, on the one hand, and, for example, to regulate the distance to a motor vehicle in front and/or to a suddenly occurring obstacle in such a way that safe braking is always guaranteed without a rear-end collision, on the other hand. For this purpose, signals from one or several ambient sensor(s), such as video cameras, are evaluated and/or the signals from RADAR and/or LIDAR sensors in relation to the surroundings of the motor vehicle.

Furthermore, it is known that steering, in particular of the front wheels of the motor vehicle, is carried out by turning at an intended steering angle α by operating a steering wheel. In a servo-assisted steering system, the controller can actuate the steering system in such a way that the motor vehicle can park automatically in a parking space previously measured by an ambient sensor, possibly also with corresponding actuation of an automatic transmission for forward and reverse driving as well as corresponding acceleration of the drive motor and the associated braking of the wheels.

For example, U.S. Pat. No. 9,108,600 B2 discloses a driving stability program for motor vehicles for avoiding a collision with an object located in a possible traffic lane. A control device can also influence a yawing movement, i.e., a steering, usually of the front wheels.

Furthermore, various systems are known to carry out the various functionalities of driver assistance systems. For example, in US 2006/100766 A1, a steering intervention is made in a steering system of the motor vehicle in order to stabilize it, particularly during braking, and to prevent skidding.

SUMMARY

The object of the invention is to propose a driving assistance system of the kind described above and to provide a corresponding method for controlling a motor vehicle in order to increase its road safety.

According to the invention, the objects are attained in each case by the features of the independent claims. Furthermore, a correspondingly equipped motor vehicle is disclosed.

The core idea of the invention is that a controller is installed in a motor vehicle in a known manner, which is designed in terms of hardware and/or software to control all essential functions of the motor vehicle, also autonomously and/or using artificial intelligence (AI). Various environmental and driving status sensors are assigned to the controller, such as speed and acceleration sensors, rotation sensors on the wheels and sensors for determining the coefficient of friction between a wheel and a surface, a GPS sensor for information on the nature and course of a road section ahead and the like. Furthermore, the motor vehicle is equipped with separately controllable braking devices for the wheels of the motor vehicle, a steering system for its front axle, for example, and possibly a servo mechanism for the steering system in order to be able to park autonomously in a parking space, for example. RADAR, LIDAR and/or optical sensors can also be provided in order to monitor the surroundings of the motor vehicle and, in particular, to detect the presence of obstacles.

If the motor vehicle detects a limit value, for example a yaw rate, i.e., a steering angle of the steering system that is too high and not adapted to the speed and/or an acceleration value that is too high, for example in the transverse direction, and/or a loss of sufficient static friction between one or more wheels and a surface, the control system is set up to stabilize the driving behavior in accordance with an ESP by selectively braking one or more wheels.

However, there is also an intervention in the steering system of the motor vehicle. For example, the motor vehicle automatically detects a further course of the road of a road section ahead via RADAR, LIDAR or optical sensors and possibly via map information from a GPS system. The controller is now set up in such a way that it can calculate, in particular depending on the current speed and a steering angle, whether, for example, braking is still possible on the well-adhering road surface or whether the road is running out, so to speak, and the motor vehicle could skid on an adjacent unpaved shoulder. If this is detected, in addition to issuing separate brake signals for the individual wheels, the control system can also issue a steering command, for example for a servomotor of the steering system, in order to keep the motor vehicle on the paved road, in particular when driving along a curve, the motor vehicle remaining on an intersecting plane of the possible dynamic vehicle area ahead with an actually existing road without skidding or colliding with other obstacles. Of course, other motor vehicles ahead and/or oncoming motor vehicles or other objects and obstacles that could lie on a possible driving path or a calculated trajectory are also taken into account, in particular taking into account their possibly changing positions.

In particular, this function only responds when the stable driving condition is no longer fulfilled, i.e., when a "stable dynamic vehicle area" has been left with certainty and has been detected by sensors, for example via wheel speeds and a movement vector of the vehicle from acceleration sensors or the integration of their vectors, which do not indicate the same direction. Only then does the system intervene in the steering angle. This is the difference to the state of the art and also important for the safety concept. The detection of the unstable dynamic vehicle area can be determined, for example, from inconsistencies between acceleration vectors, wheel rotation numbers, absolute or relative speeds and the like by a central controller which records and processes all sensor signals of a motor vehicle. Limit values above which an inconsistency is assumed can also be adjustable.

The invention allows the vehicle, which is already sliding on the road with at least one wheel, for example, to slide in one direction in a targeted manner and wants to influence the direction while sliding. If the wheels run on different surfaces, even with sliding friction, when the wheels have lost static friction, with different friction values $\mu$, for example the right wheel in motion on the grass strip at the edge, this changed $\mu$, i.e., a friction value on the grass strip, can now also be included in a vehicle dynamics model in order to calculate the ideal steering angle by numerical optimization in order to keep the vehicle on the ideal trajectory, i.e., in particular on the road and/or at least to avoid a collision with an obstacle.

If the controller intervenes, optical, acoustic and/or haptic warning signals can also be emitted to a driver of the motor vehicle in order to draw their attention to the intervention of the controller, particularly in the steering system.

The following optimization problem is solved with a method and a device for influencing the braking behavior and the steering system of the motor vehicle:

$$\max_{steering\ angle\ \alpha \in [0,2\pi], brake\ sig.b_1, b_2, b_3, b_4, \in \{0,1\}} W_{fs}(\alpha, b_i \mid s)$$

with the free safe path $W_{fs}$ and the vector of sensor signals s.

The extended intelligent vehicle stability program is activated in the same way as the conventional ESP, for example if the wheel position and wheel speeds and/or acceleration directions are not consistent, in particular if a threshold or limit value, which can also be set, is exceeded. The conventional ESP reacts with braking interventions, while a steering angle could lead the motor vehicle to skid and/or leave the road. In contrast, the solution according to the invention determines the reachable dynamic vehicle area either continuously or as soon as entry into the limit area is detected. The area is determined over time by the steering angles reachable from the current vehicle state such as acceleration tensor, speed vector, location on a road et cetera with the current conditions such as, in particular, the friction coefficients between wheels and road through steering, braking and, if applicable, throttle impacts. In particular, a new steering angle is then set in such a way that the motor vehicle remains on an intersecting plane of the possible dynamic vehicle area ahead with an actually existing road without skidding or colliding with other obstacles.

The front limit of the reachable dynamic vehicle area is defined by the speed, the product of speed and a predetermined time, i.e., a distance, or the distance until the vehicle comes to a standstill. The stability program preferably works cyclically and determines this area in each cycle. It also uses this area and additional information to determine how to steer in this time step. Braking reactions and/or, if necessary, throttle jolts are either carried out as a secondary consequence of the resulting discrepancy between the new steering angle and wheel speeds and/or acceleration measurements, i.e., as a conventional ESP reaction, or are optimized together with the steering angle.

It is understood that a corresponding hardware and/or software controller is part of an overall control system of the motor vehicle, for example. Furthermore, the respective sensor signals are received by corresponding data and/or control lines and processed in a corresponding computerized device. Subsequently, the separate brake commands are issued to the individual wheels via data and/or control lines, as well as a steering command, for example to the servo steering of the motor vehicle. The method is carried out in the correspondingly designed controller.

It is understood that preferably a motor vehicle is equipped with such a controller or is controlled according to this method.

Furthermore, the entire system can be deactivated at the driver's request in the same way as an ESP system if this is desired, for example to be able to drift through a curve.

Artificial intelligence (AI) can also be used to evaluate the signals from the sensors and determine the corresponding control and steering commands to maintain a stable vehicle state.

The advantage of the invention is that an existing motor vehicle, which is usually already equipped with appropriate sensors, driving assistance systems and the like, can have a method implemented in its control system without considerable additional effort in order to ensure driving safety and, in particular, that it remains in a lane even when driving along a curve. This effectively prevents accidents.

Each dependent claim represents advantageous embodiments of the invention.

In a first embodiment, a braking intervention, for example by a known ESP system, and the determination of an optimum steering angle, for example to keep a motor vehicle on the paved road in a curve, can be carried out parallel or independently. This means that two processes are carried out simultaneously in the control system. On the one hand, this is the known braking intervention of an ESP system and, on the other hand, depending on sensor signals about the environment, a determination of a targeted steering intervention in order to determine and execute the motor vehicle depending on speed, acceleration values, static friction of the wheels, previous steering wheel position and information about the environment, for example from RADAR sensors.

Alternatively, a cascaded design is also possible. This means that once an optimum steering angle has been determined, this signal is also processed by an ESP system during targeted braking of the wheels, for example to prevent the wheels from locking in the event of a sharp turn. In principle, this can also be effected the other way round, i.e., the ESP system first determines a braking intervention and this is then taken into account for a possible steering angle of the wheels.

In a preferred embodiment, braking of the wheels with an ESP system and an ideal steering angle are jointly determined by the control system and corresponding control signals are output. The longest free safe path, $\max W_{fs}$, can either simply be the longest path within the lane or an existing road. Steering angle and brake signals should be set accordingly so that the vehicle is kept in its lane. This case has the advantage that it is comparatively easy to safeguard, as only one abstraction function, namely lane detection, needs to be carried out safely. Alternatively, the longest path without a collision is determined taking moving and stationary objects into account. In this case, both collision-capable objects and their movements, known as trajectories, can be reliably detected. For example, there may be stationary objects, such as an unexpected snowdrift on the road, that should be avoided or other road users on the same road with oncoming traffic.

Furthermore, the system can be designed in such a way that one or several drive motors emit targeted gas pulses, i.e., acceleration takes place if this leads to an increase in driving stability in combination with a steering intervention and/or targeted braking of a non-accelerated wheel. A corresponding intervention can take place via a motor controller. In the case of an all-wheel drive in particular, a differential lock between the front and rear axles and/or between the driven wheels on one axle can also be activated, for example, in order to accelerate only one wheel on the outside of a curve.

It is understood that the features mentioned above and to be explained below are usable not only in the combination indicated in each case, but also in other combinations. The scope of the invention is defined only by the claims.

BRIEF DESCRIPTION OF THE DRAWING
FIGURES

The invention is explained in more detail below with reference to the associated drawing.

In the purely schematic FIGS. 1 to 3, the same reference symbols refer to the same components in each case. The same applies to the individual parts of the respective figure descriptions.

DETAILED DESCRIPTION

Figure 1:
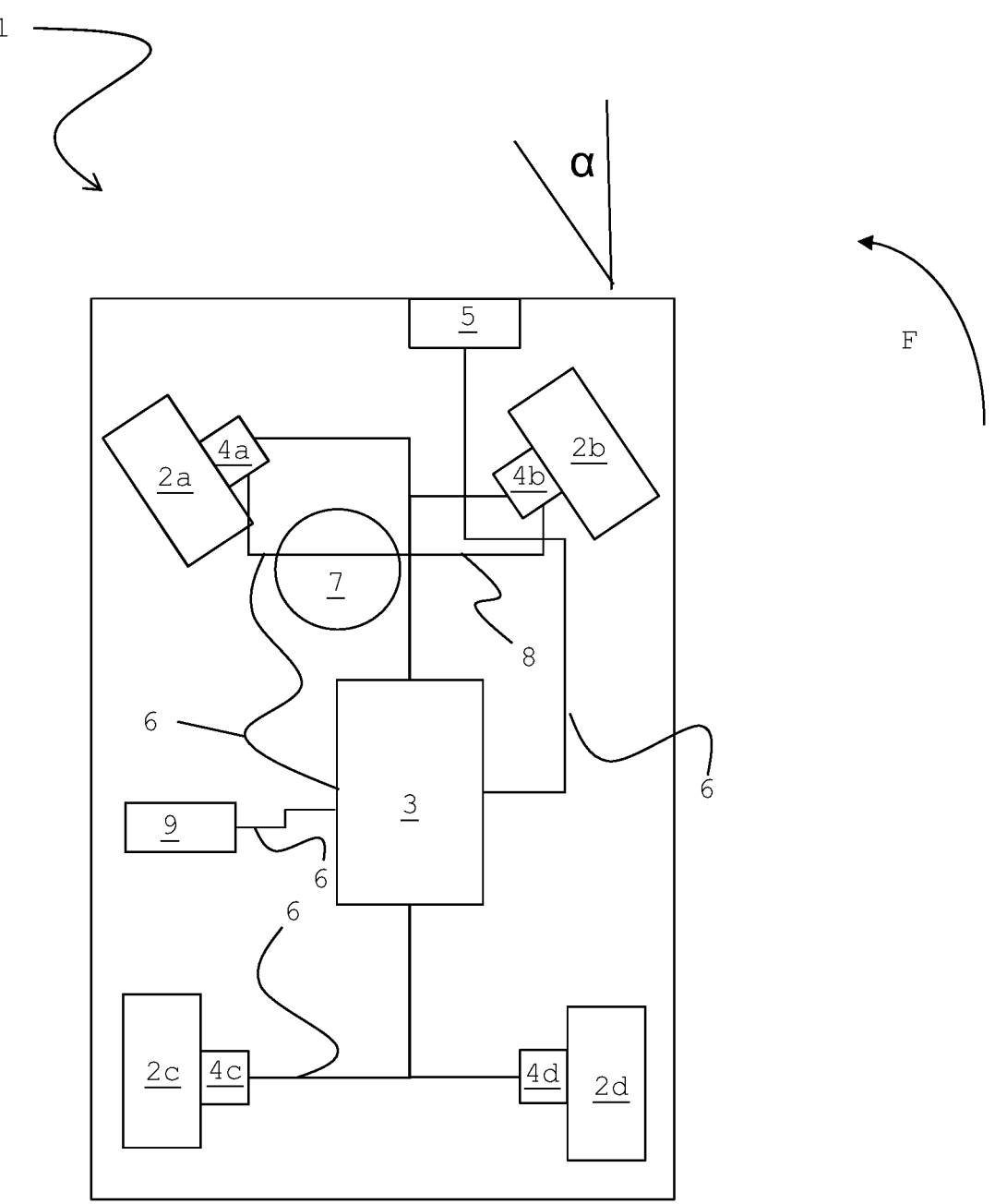
FIG. 1 shows a schematic view of a motor vehicle.

FIG. 1 shows a motor vehicle in purely schematic form. It usually comprises at least one drive motor (not shown) and a steering system 8 with steering wheel 7 in order to obtain an intended steering angle α of two front wheels 2a, 2b, here to the left, so that motor vehicle 1 moves to the left in moving direction F.

Braking devices 4a, 4b, 4c, 4d are arranged on all four wheels 2a, 2b, 2c, 2d, such as a disc brake in each case, in order to be able to brake wheel 2a, 2b, 2c, 2d in question in a targeted manner. Brakes 4a, 4b, 4c, 4d are actuated for this purpose via control and/or signal lines 6 from a central controller 3 of the motor vehicle corresponding to a known ESP system.

Furthermore, steering system 8, in particular an associated servomotor, can also be controlled by controller 3 via a control line 6 in order to automatically turn front wheels 2a, 2b at steering angle α. An ambient sensor 5, which is also connected to controller 3 via a control line 6, is used to detect an environment. Ambient sensor 5 is, for example, a RADAR and/or LIDAR and/or a video sensor. A wet road condition or precipitation can also be detected. Furthermore, a driving status sensor 9 is provided which records, for example, the acceleration values of motor vehicle 1 in all three spatial directions, the acceleration tensor, and/or the current vehicle speed in all three spatial directions, the speed vector, and/or a static friction coefficient between wheels 2a, 2b, 2c, 2d and a road as well as their respective current number of revolutions and/or the current position of the motor vehicle on a road as well as its further course of the road via a GPS system. Driving status sensor 9 is also connected to controller 3 via a data or control line 6.

Based on this information and current steering angle α, the controller 3, which is set up accordingly in terms of hardware and/or software, can automatically brake individual wheels 2a, 2b, 2c, 2d in accordance with a known ESP system and also influence steering system 8 independently of a position of steering wheel 7 in order to restore or maintain a stable driving state of motor vehicle 1, taking into account the road and its course. Furthermore, a drive motor and corresponding components of a gearbox can also be controlled accordingly in order to accelerate one or more of wheels 2a, 2b, 2c, 2d in order to maintain a stable driving state of the motor vehicle, as well.

In particular, this is done autonomously without the intervention of a driver of motor vehicle 1. The monitoring of the states of all components of motor vehicle 1 and its surroundings is preferably carried out cyclically at high frequency in order to enable rapid adaptation to changing traffic conditions.

Figure 2:
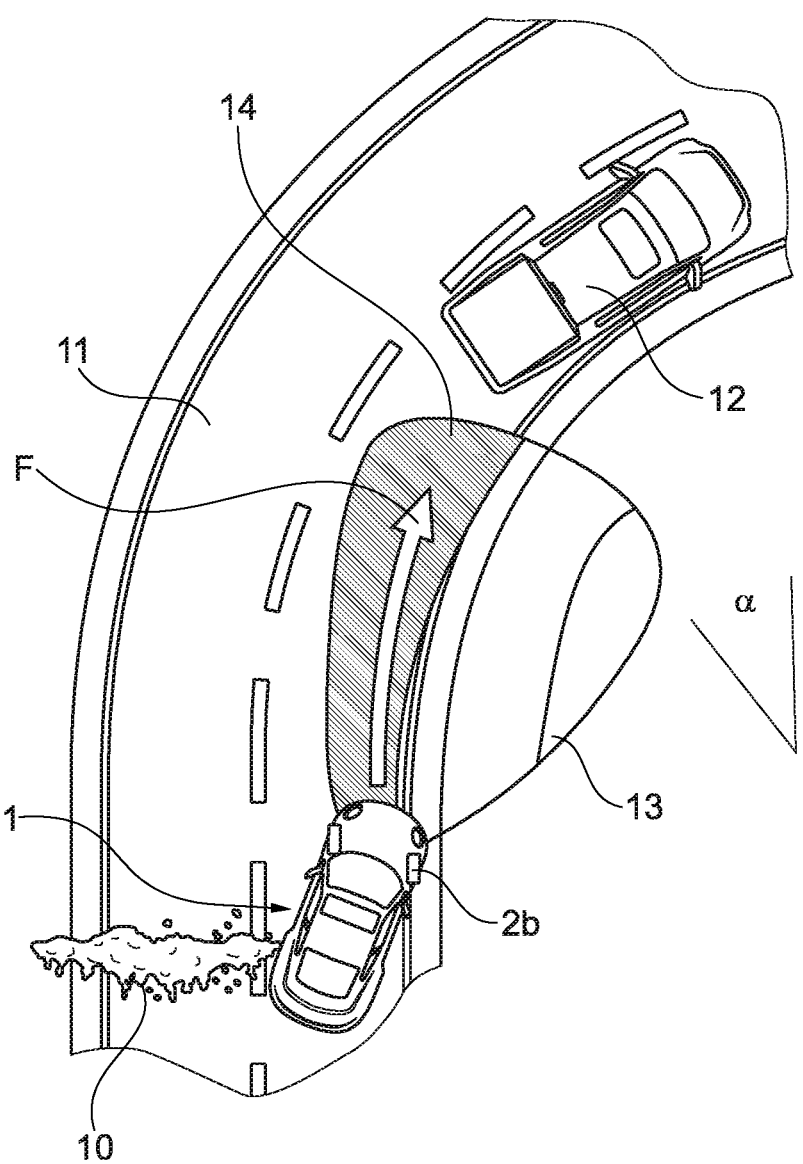
FIG. 2 shows a top view of the motor vehicle when driving along a curve.

FIG. 2 shows a driving situation of motor vehicle 1 driving along a right-hand curve. The driver had to avoid an obstacle 10 such as a snow bank or they drove through a snow bank with the left wheels, for example. The snow brakes the left half of the vehicle relatively abruptly as it passes through and the vehicle turns to the left without this being reflected by the position of the wheels and the speed vector, which does not want to follow a curve despite the impact. If the vehicle is accelerated or braked while driving through the curve, so that longitudinal forces act on the tires, the changing friction u, which starts out as static friction and turns into sliding friction once the tires affected become unstable, may cause the vehicle to swerve. If a non-straight steering position is assumed while driving through, so that lateral forces act on the tires, the different u can also take effect. When driving straight ahead, motor vehicle 1 would leave a road 11 on the inside of a curve and could skid on an unpaved road edge. Even with a conventional ESP program, driving stability could then not be guaranteed when braking. In particular, although an ESP system could restore a stable driving state, a moving direction of motor vehicle 1 would—in all probability—no longer correspond to the course of road 11 ahead, i.e., motor vehicle 1 would veer off road 11.

Now, however, controller 3 of motor vehicle 1 is set up in such a way that it can automatically calculate a steering angle α from the measured values of ambient sensor 5 and driving status sensor 9 and transmit it to a steering system 8 of motor vehicle 1 via control lines 6. Subsequently, the front wheels (here only right front wheel 2b is designated as an example) are then turned in such a way that in a possible dynamic vehicle area 13 (which is indicated here essentially in the shape of a club in front of motor vehicle 1), motor vehicle 1 is held within intended area 14, which essentially represents the intersecting plane with road 11 and is hatched here. This allows motor vehicle 1 to continue driving through the curve in the intended moving direction F, although it may also brake automatically to avoid hitting another motor vehicle 12 ahead that is also driving through the curve. For all obstacles, a trajectory relative to the vehicle trajectory or relative to the stationary world is estimated. In the simplest case, this can be assumed to be linear from calculation step to calculation step and extrapolated into the future if the calculation steps are sufficiently frequent. Using the trajectories of moving and stationary objects, the lengths of time to the first collision can be determined depending on the trajectory, i.e., the selected steering position, and braking interventions, in order to select the steering position and braking interventions in such a way that the length of time before a collision and also before leaving the road is maximized.

Figure 3:
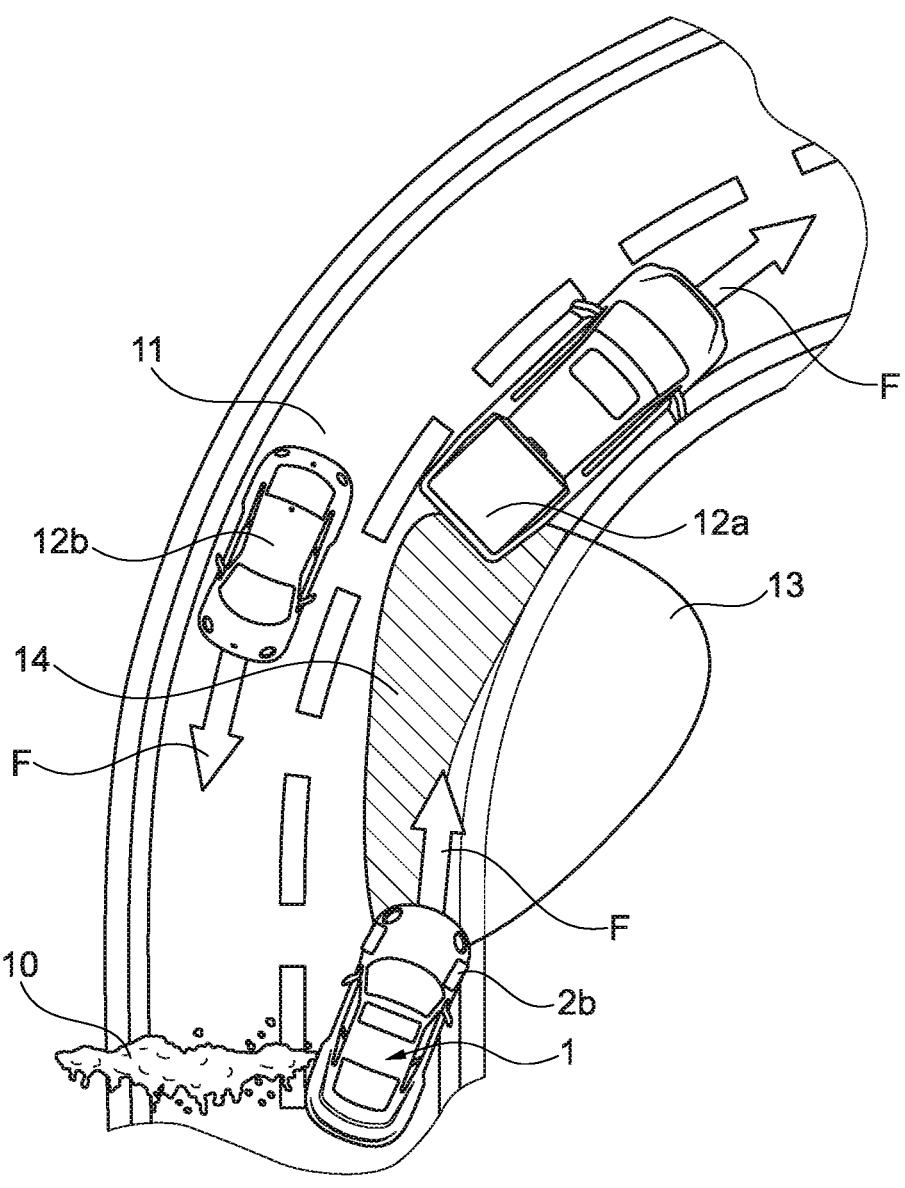
FIG. 3 shows another top view of the motor vehicle with oncoming traffic.

FIG. 3 shows the same situation, with a first other motor vehicle 12a traveling in the same moving direction F as motor vehicle 1 and a second other motor vehicle 12b traveling in the opposite moving direction F. In this case, possible dynamic vehicle area 13 on road 11 must be selected in such a way that a collision with second other motor vehicle 12b and a driving into first other motor vehicle 12a is effectively avoided. For this purpose, the front wheels (indicated here by the right front wheel 2b) can be turned later in order to remain reliably in their own lane.

In an execution program, the position of the moving objects or obstacles is estimated in the next calculation step(s) or in the calculation step(s) following thereafter using the current trajectory. With sufficiently short calculation cycles, the change is very small, so that even a linear estimate, i.e., a current position+(dt of the velocity vector), contains only very small deviations. For better accuracy, the future location of other vehicles, obstacles and objects can also be estimated using higher order terms from sensor data with computer vision, for example+(dt^2/2 of the acceleration vector)+ . . . .

A linear estimate for extremely large dt is exaggerated in FIG. 3. Like other obstacles, the estimated positions of the objects are subtracted from the dynamically possible vehicle area.

Figure 4:
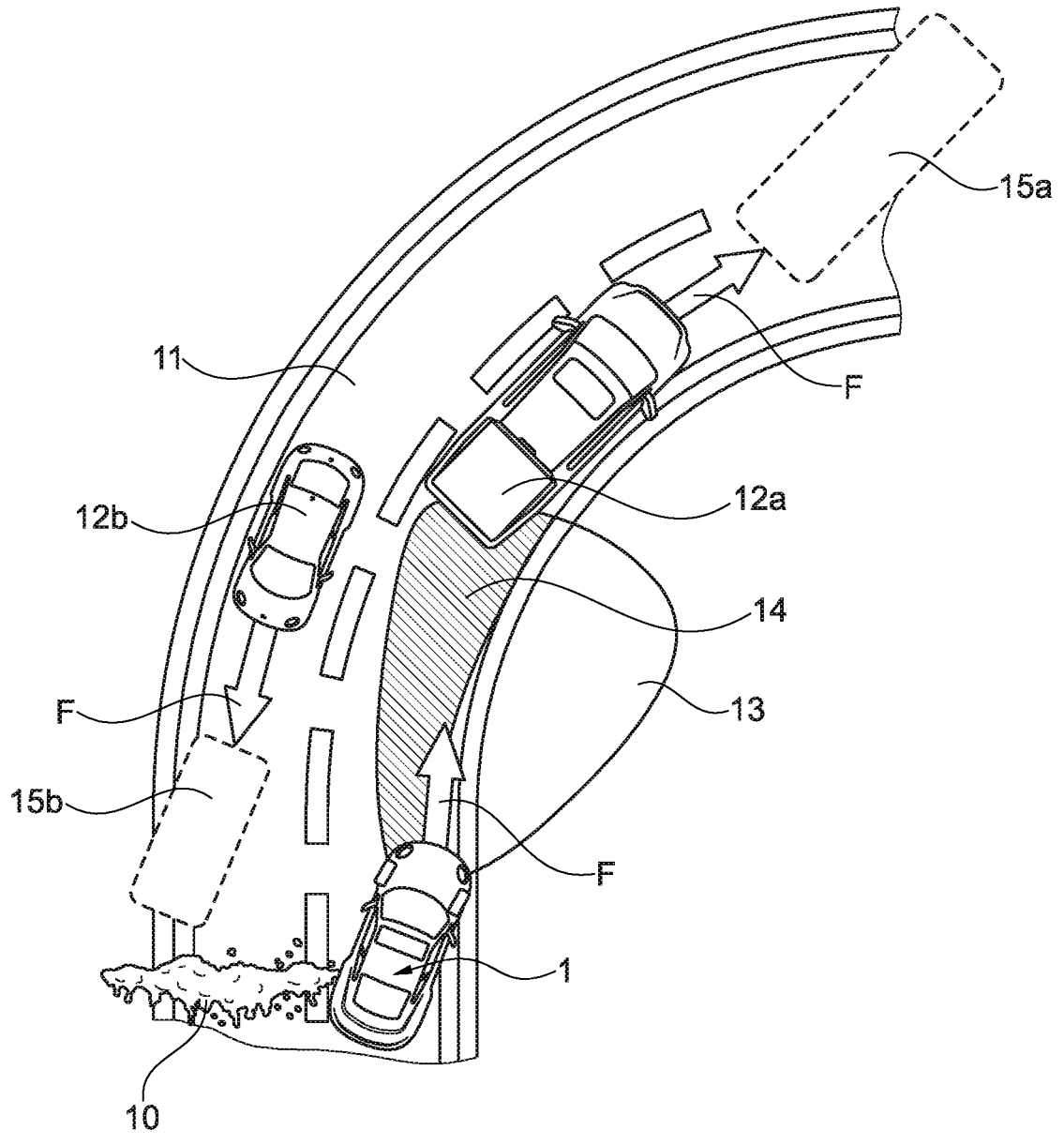
FIG. 4 shows a another top view of the motor vehicle with a projection into the future.

In particular, FIG. 4 shows how two other motor vehicles 12a, 12b continue to move along the road 11 within time period dt, at least mathematically simulated, assuming normal driving. After time period dt, they each assume projected position 15a, 15b and should therefore pose no danger to their own motor vehicle 1.

REFERENCE SIGNS 1. motor vehicle
2. wheel of 1
3. controller of 1
4. braking device for 2
5. ambient sensor
6. control line
7. steering wheel of 1
8. steering system of 1
9. driving status sensor
10. obstacle
11. road
12. other motor vehicle
13. possible dynamic vehicle area
14. intended area
15. projected position
α steering angle of 8
F moving direction of 1

The invention claimed is:

1. A driving system for a motor vehicle including a drive motor, a steering system, wheels, and braking devices for the individual wheels, the driving system comprising:

an ambient sensor;
a driving status sensor; and
a controller configured to (a) receive signals from the ambient sensor and the driving status sensor, (b) determine from the signals whether a steering angle (α) provides a stable driving status, and if inconsistencies between acceleration vectors, wheel rotation numbers, vehicle speed and friction coefficients indicate that a stable dynamic vehicle area has been left, calculate a reachable dynamic vehicle area ahead of the vehicle and define an intended area as an intersection of the reachable dynamic vehicle area with an actually existing paved road and (c) adjust, at the steering system, the steering angle (α) and, at the braking devices, targeted braking of the wheels in order to maintain the motor vehicle within the intended area without skidding or colliding with obstacles.

2. The driving system of claim 1, wherein the controller is adapted to determine the steering angle (α) irrespective of the targeted braking of the wheels.

3. The driving system of claim 2, wherein the controller is adapted to control the drive motor so that one or more wheels are accelerated in a targeted manner.

4. The driving system of claim 1, wherein the controller is adapted to determine the steering angle (α) depending on the targeted braking of the wheels.

5. The driving system of claim 4, wherein the controller is adapted to control the drive motor so that one or more wheels are accelerated in a targeted manner.

6. The driving system of claim 1, wherein the controller is adapted to jointly determine the steering angle (α) and the targeted braking of the wheels.

7. The driving system of claim 6, wherein the controller is adapted to control the drive motor so that one or more wheels are accelerated in a targeted manner.

8. A method of controlling a motor vehicle including a drive motor, a steering system, wheels, braking devices for the individual wheels, an ambient sensor and a driving status sensor, comprising:

receiving, by a controller, signals from the ambient sensor and the driving status sensor;

determining, by the controller, from the signals whether a steering angle (α) provides a stable driving status, and if inconsistencies between acceleration vectors, wheel rotation numbers, vehicle speed and friction coefficients indicate that a stable dynamic vehicle area has been left, calculating a reachable dynamic vehicle area ahead of the vehicle and defining an intended area as an intersection of the reachable dynamic vehicle area with an actually existing paved road; and adjusting, by the controller, (a) the steering angle (α) at the steering system and (b) targeted braking of the wheels at the braking devices in order to maintain the motor vehicle within the intended area without skidding or colliding with obstacles.

9. The method of claim 8, including determining, by the controller, the steering angle (α) irrespective of the targeted braking of the wheels.

10. The method of claim 9, including controlling, by the controller, the drive motor so that one or more wheels are accelerated in a targeted manner.

11. The method of claim 8, including determining, by the controller, the steering angle (α) depending on the targeted braking of the wheels.

12. The method of claim 11, including controlling, by the controller, the drive motor so that one or more wheels are accelerated in a targeted manner.

13. The method of claim 8, including jointly determining, by the controller, the steering angle ($\alpha$) and the targeted braking of the wheels.

14. The method of claim 13, including controlling, by the controller, the drive motor so that one or more wheels are accelerated in a targeted manner.

15. A motor vehicle, comprising:

a drive motor;

a steering system;

wheels;

braking devices for the individual wheels;

an ambient sensor;

a driving status sensor; and a controller configured to (a) receive signals from the ambient sensor and the driving status sensor, (b) determine from the signals whether a steering angle ($\alpha$) provides a stable driving status, and if inconsistencies between acceleration vectors, wheel rotation numbers, vehicle speed and friction coefficients indicate that a stable dynamic vehicle area has been left, calculate a reachable dynamic vehicle area ahead of the vehicle and define an intended area as an intersection of the reachable dynamic vehicle area with an actually existing paved road and (c) adjust, at the steering system, the steering angle ($\alpha$) and, at the braking devices, targeted braking of the wheels in order to maintain the motor vehicle within the intended area without skidding or colliding with obstacles.

\* \* \* \* \*